(12) United States Patent
Yang et al.

(10) Patent No.: US 11,997,734 B2
(45) Date of Patent: May 28, 2024

(54) WIRELESS HEADPHONE MATCHING METHOD, DEVICE, TERMINAL AND CHARGING BOX

(71) Applicant: GOERTEK TECHNOLOGY CO., LTD., Shandong (CN)

(72) Inventors: Zongxu Yang, Shandong (CN); Haizhu Xu, Shandong (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 417 days.

(21) Appl. No.: 17/423,409

(22) PCT Filed: Sep. 26, 2019

(86) PCT No.: PCT/CN2019/108249
§ 371 (c)(1),
(2) Date: Jul. 15, 2021

(87) PCT Pub. No.: WO2020/147342
PCT Pub. Date: Jul. 23, 2020

(65) Prior Publication Data
US 2022/0078864 A1 Mar. 10, 2022

(30) Foreign Application Priority Data
Jan. 16, 2019 (CN) .......................... 201910040451.0

(51) Int. Cl.
*H04W 76/15* (2018.01)
*H04L 5/00* (2006.01)
(Continued)

(52) U.S. Cl.
CPC ............ *H04W 76/15* (2018.02); *H04L 5/0053* (2013.01); *H04R 1/1025* (2013.01); *H04W 12/55* (2021.01); *H04W 72/56* (2023.01)

(58) Field of Classification Search
CPC ..... H04W 76/15; H04W 12/55; H04W 72/56; H04W 84/18; H04W 76/10; H04L 5/0053;
(Continued)

(56) References Cited

U.S. PATENT DOCUMENTS

| 10,110,030 B1 | 10/2018 | Colosimo et al. |
| 2017/0093079 A1 | 3/2017 | Wagman et al. |

(Continued)

FOREIGN PATENT DOCUMENTS

| CN | 106559721 | 4/2017 |
| CN | 106998511 | 8/2017 |

(Continued)

OTHER PUBLICATIONS

International Search Report issued in PCT/CN2019/108249 dated Dec. 27, 2019.

*Primary Examiner* — Chae S Lee
(74) *Attorney, Agent, or Firm* — HAUPTMAN HAM, LLP

(57) ABSTRACT

Provided are a pairing method and apparatus for a wireless earbud, a terminal and a charging box. The method includes: detecting identification information of a charging box, and establishing a communication connection with the charging box based on the identification information; acquiring pairing information of two wireless earbuds in the charging box transmitted from the charging box, where each of the two wireless earbuds is in a communication connection with the charging box; and sending a pairing instruction to the charging box based on the pairing information, and activating a pairing state, so that the charging box controls a corresponding wireless earbud to be paired with and connected with the terminal based on the pairing instruction. In this way, the terminal can be quickly and accurately paired with and connected with the two wireless earbuds in the charging box, which avoids error operations or complicated operations, thereby improving user experience.

6 Claims, 7 Drawing Sheets

(51) Int. Cl.
  *H04R 1/10*    (2006.01)
  *H04W 12/55*   (2021.01)
  *H04W 72/56*   (2023.01)

(58) Field of Classification Search
  CPC . H04R 1/1025; H04R 1/1016; H04R 2420/07
  See application file for complete search history.

(56) References Cited

U.S. PATENT DOCUMENTS

| | | | |
|---|---|---|---|
| 2017/0094399 A1* | 3/2017 | Chandramohan | H04R 5/033 |
| 2018/0041827 A1  | 2/2018 | Abdelmalek | |
| 2018/0248414 A1* | 8/2018 | Liu | H04R 1/1025 |
| 2019/0052105 A1* | 2/2019 | Wang | G06F 13/4282 |
| 2022/0039179 A1* | 2/2022 | Chen | H04R 1/1016 |

FOREIGN PATENT DOCUMENTS

| | | | |
|---|---|---|---|
| CN | 206977650 | | 2/2018 |
| CN | 108174457 | | 6/2018 |
| CN | 108462955 | | 8/2018 |
| CN | 108696946 | | 10/2018 |
| CN | 108738008 | | 11/2018 |
| CN | 108811182 | | 11/2018 |
| CN | 108901006 | * | 11/2018 |
| CN | 109168101 | | 1/2019 |
| CN | 109600694 | | 4/2019 |

\* cited by examiner

WIRELESS HEADPHONE MATCHING METHOD, DEVICE, TERMINAL AND CHARGING BOX

This application is a 371 Application of International Patent Application No. PCT/CN2019/108249, titled "WIRELESS HEADPHONE MATCHING METHOD, DEVICE, TERMINAL AND CHARGING BOX", and filed Sep. 26, 2019, which claims the benefit of Chinese Patent Application No. 201910040451.0, titled "PAIRING METHOD AND APPARATUS FOR WIRELESS EARBUD, TERMINAL AND CHARGING BOX", and filed Jan. 16, 2019 with the China National Intellectual Property Administration (CNIPA), which are incorporated herein by reference in their entirety.

FIELD

The present disclosure relates to the technical field of portable listening device, and in particular to a pairing method and apparatus for a wireless earbud, a terminal, and a charging box.

BACKGROUND

At present, an earbud may be classified as a wired earbud and a wireless earbud. The wired earbud needs a left earbud and a right earbud to be connected in a wired manner, to form left and right sound tracks and generate a stereo effect. As such, the wired earbud is inconvenient to wear. The wireless earbud communicates with a terminal through a wireless communication protocol (for example, Bluetooth). Compared with the wired earbud, it is not required for the wireless earbud to pack a data cable and thus is convenient to use. The latest true wireless interconnected stereo Bluetooth earbud (TWS earbud) is a typical wireless bud.

In the conventional technology, the wireless earbud such as the TWS earbud generally includes a master earbud and a slave earbud during use, and their pairing states include TWS pairing, dual-earbuds pairing, mono usage scenario pairing, and the like. For a terminal user, it is easy to confuse various pairing states, which may lead to abnormal situations in which pairing is failed or only single earbud is paired and works, and generate poor user experience.

Therefore, it needs to solve how to enable a quick and accurate pairing and connection between a terminal and two wireless earbuds, so as to avoid error operations in pairing of the wireless earbuds and complicated processes such as searching for connection on a Bluetooth interface of a mobile phone, thereby improving user experience.

SUMMARY

An objective of the present disclosure is to provide a pairing method and apparatus for a wireless earbud, a terminal and a charging box, to realize a fast and accurate pairing and connection between a terminal and two wireless earbuds by means of a charging box, and thereby improve user experience.

To solve the above technical problems, a pairing method for a wireless earbud is provided in the present disclosure. The pairing method includes:
detecting, by a terminal, identification information of a charging box, and establishing a communication connection with the charging box based on the identification information;
acquiring pairing information of two wireless earbuds in the charging box transmitted from the charging box, where each of the two wireless earbuds is in a communication connection with the charging box; and
sending a pairing instruction to the charging box based on the pairing information, and activating a pairing state, so that the charging box controls a corresponding wireless earbud to be paired with and connected with the terminal based on the pairing instruction.

In an embodiment, the detecting, by a terminal, identification information of a charging box and establishing a communication connection with the charging box based on the identification information includes:
detecting PID/VID information of the charging box establishing a USB connection with the terminal;
determining whether the PID/VID information is charging box information; and
establishing a USB communication connection with the charging box, in response to a positive determination.

In an embodiment, in a case that the wireless earbud is a TWS earbud, the sending a pairing instruction to the charging box based on the pairing information and activating a pairing state, so that the charging box controls a corresponding wireless earbud to be paired with and connected with the terminal based on the pairing instruction includes:
sending, based on Bluetooth addresses and master-slave state information of the two wireless earbuds in the pairing information, the pairing instruction to the charging box, and receiving pairing state information of the two wireless earbuds returned from the charging box;
and activating the pairing state to pair with and connect with a master device of the two wireless earbuds, when the pairing state information indicates a successful pairing of the two wireless earbuds.

A pairing apparatus for a wireless earbud is further provided in the present disclosure. The pairing apparatus includes:
a communication establishment module, configured to detect identification information of a charging box and establish a communication connection with the charging box based on the identification information;
an acquisition module, configured to acquire pairing information of two wireless earbuds in the charging box transmitted from the charging box; and
a pairing module, configured to send a pairing instruction to the charging box based on the pairing information, and activate a pairing state, so that the charging box controls a corresponding wireless earbud to be paired with and connected with a terminal based on the pairing instruction.

A terminal is further provided in the present disclosure. The terminal includes:
a memory for storing a computer program; and
a processor, configured to, when executing the computer program, implement steps of the pairing method for a wireless earbud according to any one of the above.

A pairing method for a wireless earbud is further provided in the present disclosure. The pairing method includes:
sending, by a charging box, a pairing information sending-instruction to two wireless earbuds in the charging box, after the charging box establishes a communication connection with a terminal;
receiving pairing information returned from the two wireless earbuds, and sending the pairing information to the terminal; and receiving a pairing instruction transmitted from the terminal, and controlling the two wireless earbuds to activate a pairing state, so that a corresponding wireless earbud is paired with and connected with the terminal.

In an embodiment, the sending a pairing information sending-instruction to two wireless earbuds in the charging box includes:

sending the pairing information sending-instruction to each of the wireless earbuds through a UART communication connection, in response to a pairing information acquiring-instruction transmitted from the terminal through a USB communication connection.

In an embodiment, in a case that the wireless earbud is a TWS earbud, the receiving a pairing instruction transmitted from the terminal, and controlling the two wireless earbuds to activate a pairing state, so that a corresponding wireless earbud is paired with and connected with the terminal includes:

sending, in response to the pairing instruction, a TWS pairing instruction to a master device of the two wireless earbuds, so that the master device is paired with and connected with the other wireless earbud; and receiving pairing state information returned from the master device, and sending the pairing state information to the terminal.

A pairing apparatus for a wireless earbud is further provided in the present disclosure. The pairing apparatus includes:

a pairing information acquisition module, configured to send a pairing information sending-instruction to two wireless earbuds in a charging box, after the charging box establishes a communication connection with a terminal;

a pairing information feedback module, configured to receive pairing information returned from the two wireless earbuds, and send the pairing information to the terminal; and a control module, configured to receive a pairing instruction transmitted from the terminal, and control the two wireless earbuds to activate a pairing state, so that a corresponding wireless earbud is paired with and connected with the terminal.

In addition, a charging box is further provided in the present disclosure. The charging box includes:

a memory for storing a computer program; and a processor, configured to, when executing the computer program, implement steps of the pairing method for a wireless earbud according to any one of the above.

The pairing method for a wireless earbud provided in the present disclosure includes: detecting, by a terminal, identification information of a charging box, and establishing a communication connection with the charging box based on the identification information; acquiring pairing information of two wireless earbuds in the charging box transmitted from the charging box, where each of the two wireless earbuds is in a communication connection with the charging box; and sending a pairing instruction to the charging box based on the pairing information, and activating a pairing state, so that the charging box controls a corresponding wireless earbud to be paired with and connected with the terminal based on the pairing instruction.

As can be seen, in the present disclosure, the terminal detects identification information of a charging box, and establishes a communication connection with the charging box based on the identification information. With the charging box being identified by the terminal, two wireless earbuds in the charging box are instructed by a particular instruction to enter in a normal pairing mode. In this way, the terminal can be quickly and accurately paired with and connected with the two wireless earbuds in the charging box, which avoids error operations in pairing of the wireless earbuds or complicated operations such as searching for connection on a Bluetooth interface of the mobile phone, thereby improving user experience. In addition, a pairing apparatus for a wireless earbud, a terminal and a charging box are further provided in the present disclosure, and also have the aforementioned advantageous effects.

BRIEF DESCRIPTION OF THE DRAWINGS

In order to clearly illustrate technical solutions in embodiments of the present disclosure or the conventional technology, drawings used in the description of the embodiments or the conventional technology are described briefly hereinafter. Apparently, the drawings described in the following simply shows embodiments of the present disclosure, and other drawings may be obtained by those ordinarily skilled in the art based on these drawings without any creative effort.

DETAILED DESCRIPTION

In order to make the objectives, technical solutions and advantages of the embodiments of the present disclosure clearer, the technical solutions in the embodiments of the present disclosure will be described clearly and completely in conjunction with the drawings of the embodiments of the present disclosure hereinafter. It is apparent that the described embodiments are only some rather than all embodiments of the present disclosure. Any other embodiments obtained by those skilled in the art based on the embodiments in the present disclosure without any creative effort shall fall within the scope of protection of the present disclosure.

Figure 1:
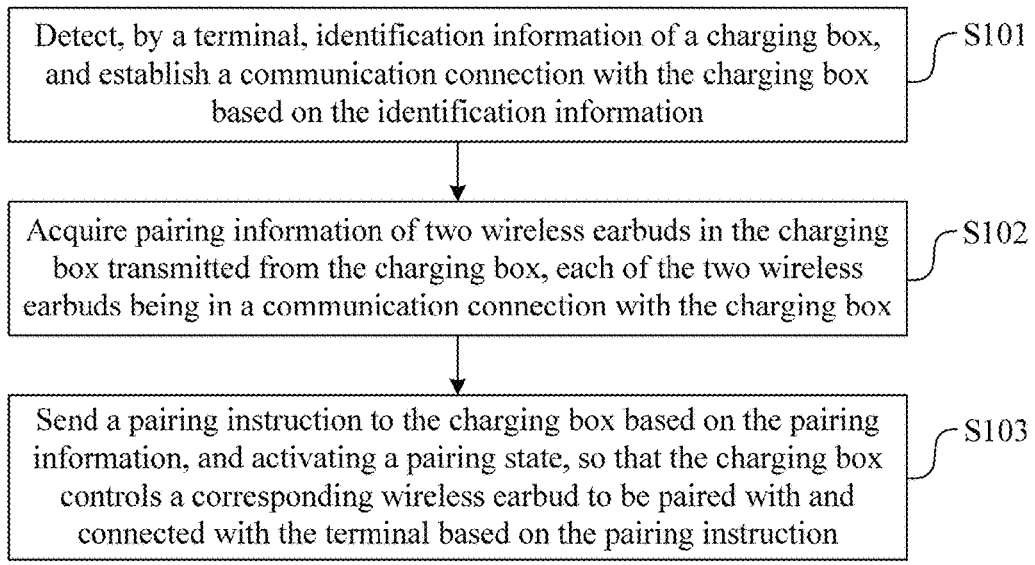
FIG. 1 is a flow chart of a pairing method for a wireless earphone in a terminal according to an embodiment of the present disclosure.

FIG. 1 is a flow chart of a pairing method for a wireless earbud in a terminal according to an embodiment of the present disclosure. Referring to FIG. 1, the method may include the following steps S101 to S103.

In step S101, identification information of a charging box is detected by a terminal, and a communication connection with the charging box is established based on the identification information.

The terminal in step S101 may be a mobile phone, or other terminal device that is able to be paired with and connected with a wireless earbud. The identification information in step S101 may be information corresponding to a device type, but is not limited thereto, as long as a processor in the terminal can identify a corresponding device type based on the identification information. Step S101 aims to make the processor in the terminal identify a charging box by detecting identification information of the device and establish a communication connection with the charging box.

Figure 2:
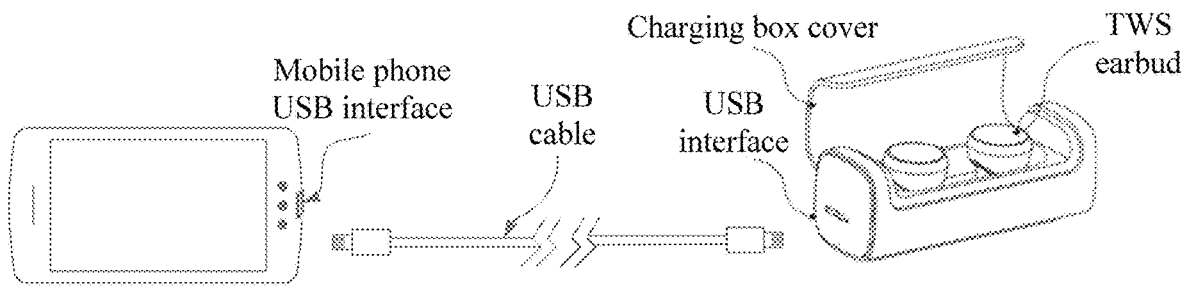
FIG. 2 is an overall schematic structural diagram of wired fast pairing with a TWS earbud according to an embodiment of the present disclosure.

A specific way of step S101 for the terminal to detect the identification information of the charging box and establish a communication connection with the charging box based on the identification information may be set by a designer based on practical scenarios and user needs. As an example, there is a wired connection between the terminal and the charging box through a USB connection as shown in FIG. 2. A USB device, when in use, has a theoretically unique PID/VID for distinguishing product model, category, supplier and other information. Therefore, in step S101, the processor of the terminal may detect the PID/VID information of the charging box establishing a USB connection with the terminal; determine whether the PID/VID information is charging box information; and establish a USB communication connection with the charging box in response to a positive determination. As another example, there is a wireless connection between the terminal and the charging box through a Bluetooth connection, that is, both of the terminal and the charging box are provided with a Bluetooth device and their respective Bluetooth devices are activated. At this time, the processor in the terminal may detect identification information (such as a name) of the activated Bluetooth device in the charging box, the identification information including the device type of the charging box; determine whether the identification information is the charging box information; and establish the Bluetooth communication connection with the charging box if the identification information is the charging box information. No limitation is made thereto in the embodiment, as long as the terminal can automatically establish a communication connection with the charging box by detecting identification information of the device.

In step S102, pairing information of two wireless earbuds in the charging box transmitted from the charging box is acquired. Each of the wireless earbuds is in a communication connection with the charging box.

It may be understood that by step S102, the terminal may acquire the pairing information of two wireless earbuds in the charging box through the established communication connection with the charging box, and thus the terminal can be paired with and connected with the two wireless earbuds in the charging box based on the pairing information.

The pairing information in step S102 may be information for the terminal to pair with and connect with the two wireless earbuds in the charging box. Specific content of the pairing information may be set by the designer based on practical scenarios and user needs. In a case that the wireless earbud is a TWS Bluetooth earbud, the pairing information may include Bluetooth addresses and master-slave state information of two wireless earbuds in the charging box; or may include only a Bluetooth address of one of the two wireless earbuds that serves as a master device in the charging box; or may include Bluetooth addresses and master-slave state information of the two wireless earbuds in the charging box, and state information indicating whether the wireless earbuds are disposed in the charging box. The content of the pairing information is not limited herein, as long as the terminal can determine, based on the pairing information, that there are two wireless earbuds in the charging box, and obtain information required for pairing with and connecting with the two wireless earbuds in the charging box.

A specific way of step S102 for the processor in the terminal to acquire the pairing information of the two wireless earbuds in the charging box transmitted from the charging box may be set by the designer. For example, the terminal may directly receive the pairing information of the two wireless earbuds in the charging box transmitted from the charging box. That is, after establishing a communication connection with the terminal, the charging box may automatically obtain the pairing information of the two wireless earbuds through communication connections with the two wireless earbuds, and send the pairing information to the terminal. Alternatively, the terminal may send a pairing information acquiring-instruction to the charging box, and receive the pairing information of the two wireless earbuds in the charging box returned from the charging box. That is, in response to receiving the pairing information acquiring-instruction transmitted from the terminal, the charging box may obtain the pairing information of the two wireless earbuds through communication connections with the two wireless earbuds, and send the pairing information to the terminal. No limitation is made thereto in this embodiment, as long as the terminal can obtain the pairing information of the two wireless earbuds in the charging box through the established communication connection with the charging box in step S102.

Figure 3:
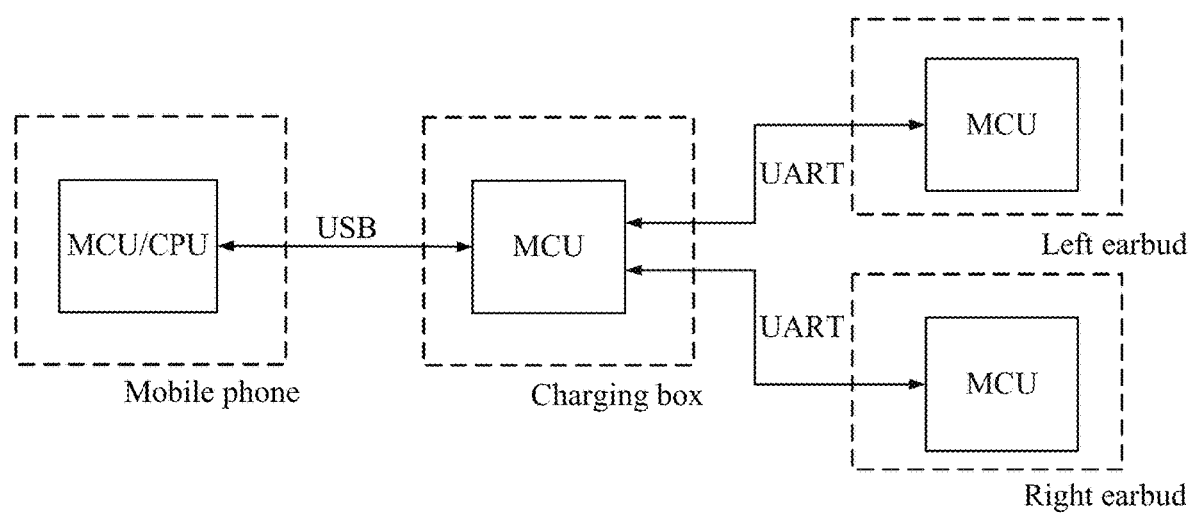
FIG. 3 is a schematic diagram of an overall communication interface for wired fast pairing with a TWS earbud according to an embodiment of the present disclosure.

It should be noted that in step S102, a specific way of the communication connection between each of the wireless earbuds and the charging box may be set by the designer based on practical scenarios and user needs. For example, the charging box may be in a wired connection with each of the wireless earbuds through a UART (Universal Asynchronous Receiver/Transmitter). As shown in FIG. 3, the processor (e.g., a microcontroller unit MCU or central processing unit CPU) in the terminal (e.g., a mobile phone) is connected to a processor (e.g., an MCU) in the charging box through a USB, and the charging box is connected to each of the wireless earbuds through UART. Alternatively, the charging box may be in a wireless connection with each of the wireless earbuds, such as through a Bluetooth connection. The specific way of the communication connection between the wireless earbuds and the charging box is not limited in the embodiment, as long as the charging box can obtain the pairing information of the two wireless earbuds in the charging box through the communication connection with each of the wireless earbuds, and send the pairing information to the terminal.

In step S103, a pairing instruction is sent to the charging box based on the pairing information, and a pairing state is activated, so that the charging box controls, in response to the pairing instruction, a corresponding wireless earbud to be paired with and connected with the terminal.

Through step S103, the processor in the terminal may use the pairing information to activate a pairing state of the terminal, and send a pairing instruction to the charging box to instruct the charging box to activate the pairing state of the two wireless earbuds in the charging box, so that a corresponding wireless earbud in the charging box is paired with and connected with the terminal, thereby realizing the pairing connection (such as TWS pairing connection) between the terminal and the two wireless earbuds. Specifically, it may be set, by the designer, the corresponding wireless earbud to be paired with and connected with the terminal in step S103. In a case that the terminal realizes the pairing connection with two wireless earbuds by being paired with and connected with a master device of the two wireless earbuds, the corresponding wireless earbud in step S103 may be one of the two wireless earbuds that serves as a master device in the charging box. In a case that the terminal realizes the pairing connection with the two wireless earbuds by being simultaneously paired with and connected with both of the two wireless earbuds, the corresponding wireless earbud in step S103 may be both the two wireless earbuds in the charging box. No limitation is made thereto in this embodiment.

Correspondingly, in a case that the terminal realizes the pairing connection with the two wireless earbuds by being paired with and connected with the master device of the two wireless earbuds, in step S103, the terminal may send a pairing instruction to the charging box based on the Bluetooth addresses and the master-slave state information of the two wireless earbuds in the pairing information, and receive pairing state information of the two wireless earbuds returned from the charging box; and activate the pairing state so as to be paired with and connected with the master device of the two wireless earbuds, when the pairing state information indicates a successful pairing of the two wireless earbuds. That is, the pairing instruction (e.g., a TWS pairing instruction) is sent to the charging box, to realize a master-slave pairing of the two wireless earbuds in the charging box; after determining that the master-slave pairing is successful based on the received pairing state information, the pairing state of the terminal is activated to realize the pairing connection between the terminal and the master device of the two wireless earbuds, and thereby realize the pairing connection between the terminal and the two wireless earbuds.

It should be noted that this embodiment illustrates an example in which the terminal realizes the pairing connection with two wireless earbuds in the charging box by means of the charging box. In a case that only one wireless earbud is placed in the charging box, the way for the terminal to realize the pairing connection with the one wireless earbud may be the same or similar as the way described above, and is not limited herein.

In this embodiment, the terminal detects identification information of a charging box, and establishes a communication connection with the charging box based on the identification information. With the charging box being identified by the terminal, two wireless earbuds in the charging box are instructed by a particular instruction to enter in a normal pairing mode. In this way, the terminal can be quickly and accurately paired with and connected with the two wireless earbuds in the charging box, which avoids error operations in pairing of the wireless earbuds or complicated operations such as searching for connection on a Bluetooth interface of the mobile phone, thereby improving user experience.

Figure 4:
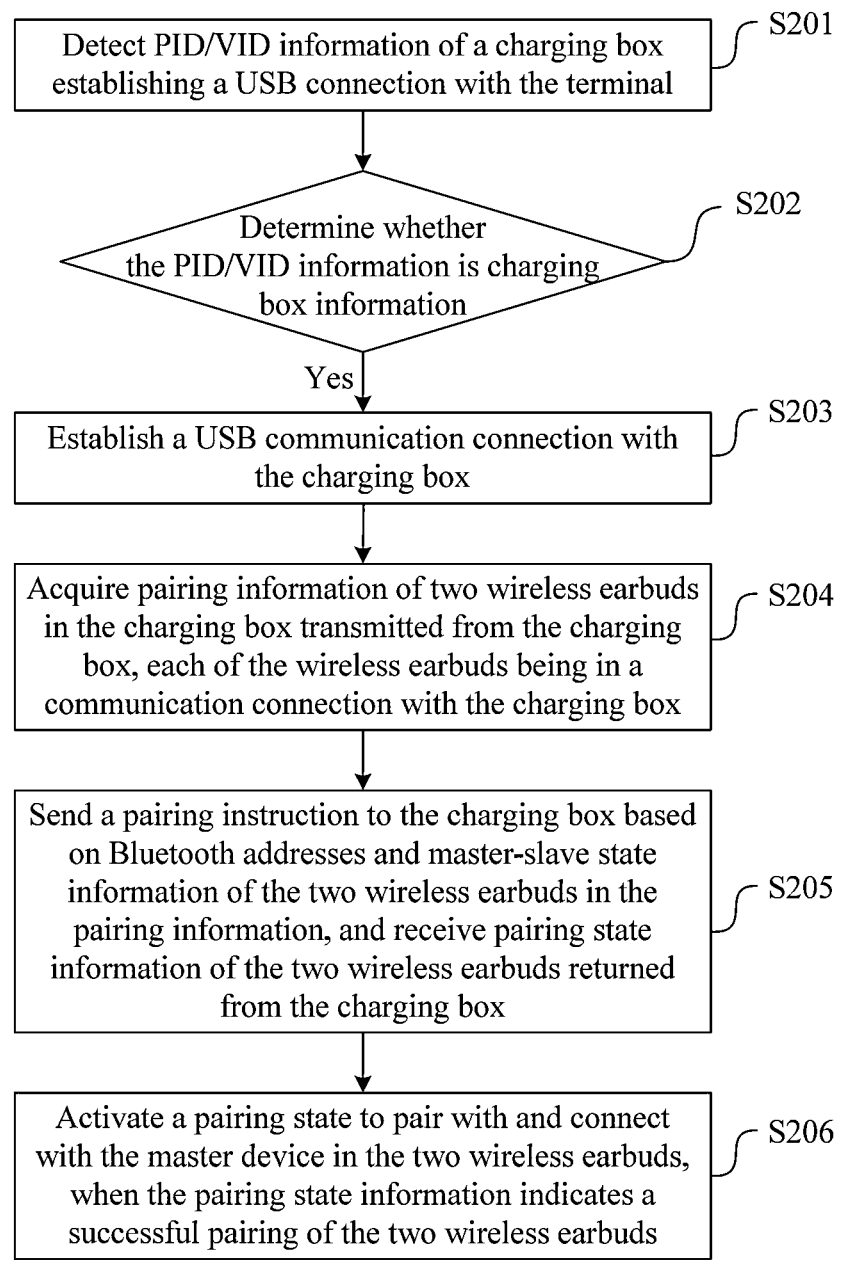
FIG. 4 is a flow chart of a pairing method for a wireless earphone in a terminal according to another embodiment of the present disclosure.

FIG. 4 is a flow chart of a pairing method for a wireless earbud in a terminal according to another embodiment of the present disclosure. Referring to FIG. 4, the method includes the following steps S201 and S206.

In step S201, PID/VID information of a charging box establishing a USB connection with the terminal is detected.

By Step S201, a processor such as an MCU or CPU in the terminal automatically detects PID/VID information of a device, upon establishing a USB connection with the device.

In step S202, it is determined whether the PID/VID information is charging box information, and proceed to step S203 in response to a positive determination.

It is understandable that in step S202, a processor in the terminal may determine whether the PID/VID information of the device in a USB connection is charging box information, that is, whether the device is of a type of charging box, so as to determine whether the device is the charging box, thereby realizing automatic identification of the charging box in a USB connection.

A specific content of the charging box information in step S202 may be set by a designer based on practical scenarios and user needs, and is not limited herein, as long as the it can be determined whether the PID/VID information of the device in a USB connection is the charging box information, so as to determine whether the device is the charging box.

For a case where it is determined in step S202 that the PID/VID information is not the charging box information, the process may directly terminate, or a normal USB connection between the terminal and the device in the conventional technology may be applied in a same or similar manner, which may be set by the designer and is not limited herein.

Figure 5:
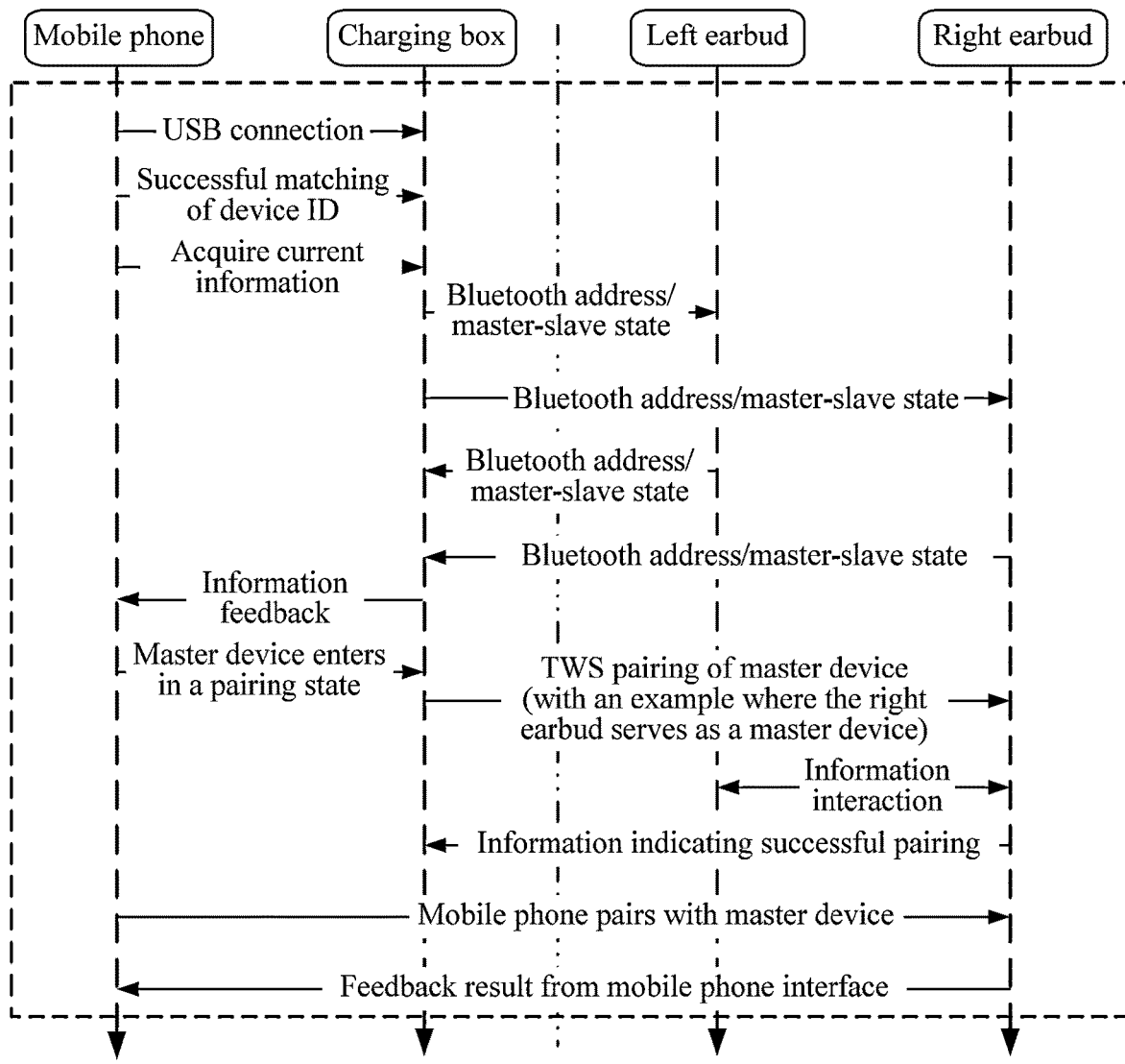
FIG. 5 is a schematic diagram of a communication and connection process for wired fast pairing with a TWS earbud according to an embodiment of the present disclosure.
Figure 6:
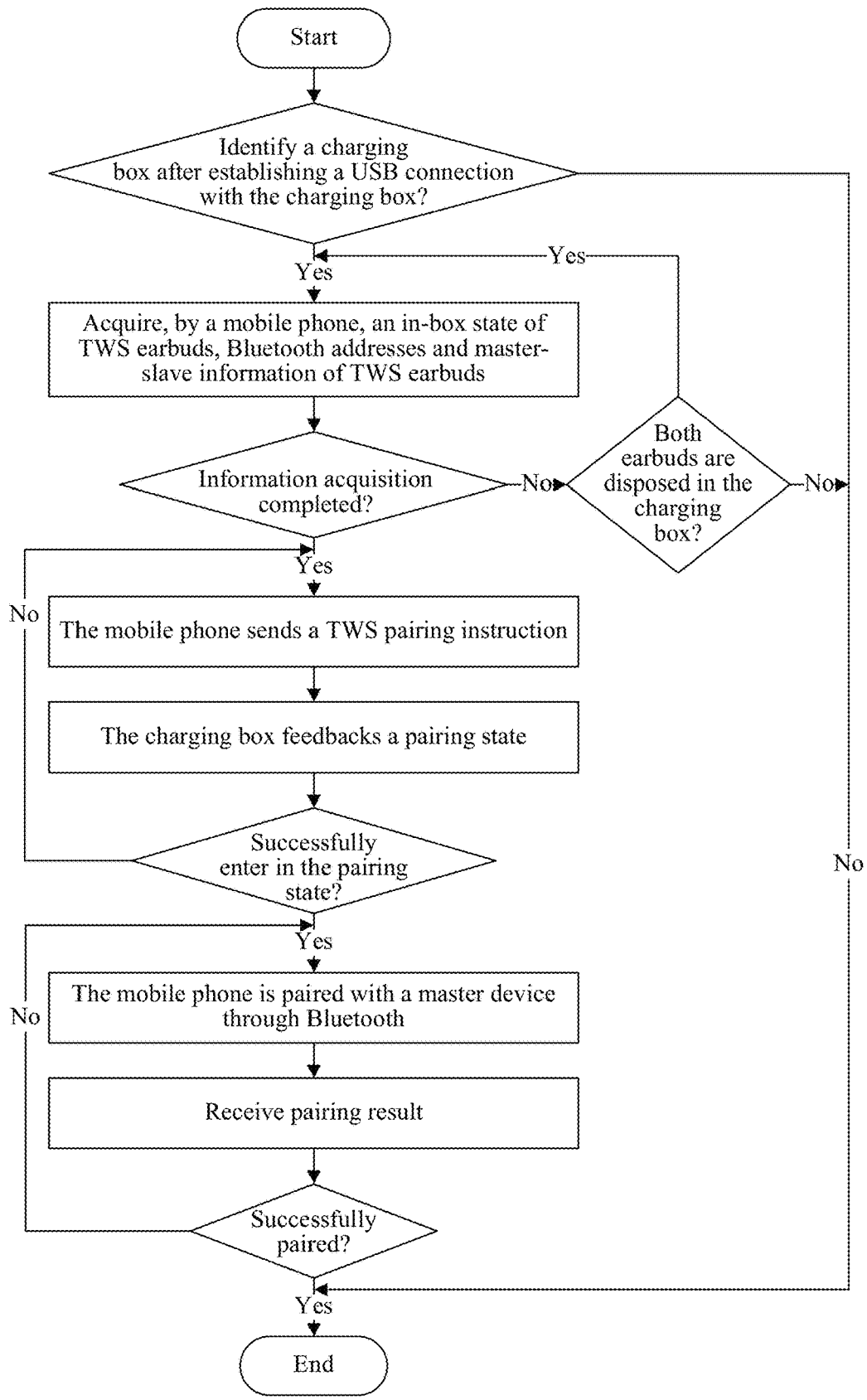
FIG. 6 is a schematic diagram of a process for wired fast pairing with a TWS earbud according to an embodiment of the present disclosure.

Specifically, as shown in FIG. 5 and FIG. 6, when the terminal is connected to the charging box via USB in step S202, the terminal may detect whether the received PID/VID information (device ID) successfully matches the charging box information, that is, identify whether the device in the USB connection is the charging box.

In step S203, a USB communication connection with the charging box is established.

The USB communication connection in step S203 may be a connection for information interaction via a USB cable between the processor in the terminal and a processor in the charging box. That is, after a user connects a USB interface of the terminal and a USB interface of the charging box through a USB cable, the processor in the terminal may automatically establish a USB communication connection to the processor in the charging box through the above steps. For example, the USB interface may be a type-C interface.

In step S204, pairing information of two wireless earbuds in the charging box transmitted from the charging box is acquired. Each of the wireless earbuds is in a communication connection with the charging box.

In an embodiment, in a case that the wireless earbud is a TWS earbud, as shown in FIG. 5, the terminal may send a pairing information acquiring-instruction to the charging box, so as to acquire current information. Correspondingly, the charging box acquires, in response to the pairing information acquiring-instruction, Bluetooth addresses and master-slave state information of the two wireless earbuds (left earbud and right earbud) in the charging box, and returns pairing information to the terminal (information feedback).

Correspondingly, as shown in FIG. 6, the pairing information acquired in step S204, that is, the information shown in FIG. 5 returned from the charging box in response to the pairing information acquiring-instruction, may include not only Bluetooth addresses and master-slave state information of the two wireless earbuds (the TWS earbuds), but also state information (in-box state) on whether the wireless earbuds are disposed in the charging box. That is, the terminal detects in-box state information of each wireless earbud through a communication circuit with each wireless earbud or a corresponding detecting device, so that the terminal may determine whether the two wireless earbuds are both disposed in the charging box based on the in-box state information of the two wireless earbuds.

Furthermore, for a case where the terminal determines that the two wireless earbuds are not both in the charging box based on the in-box state information of the two wireless earbuds in the paring information, the process may directly terminate as shown in FIG. 6; or information for prompting the user to put the two wireless earbuds in the charging box may be displayed in the terminal; or the terminal may be configured to, when it is determined that only one earbud is in the charging box, be paired with and connected with the one wireless earbud through the charging box, which may be set by the designer and is not limited herein.

In step S205, a pairing instruction is sent to the charging box based on the Bluetooth addresses and the master-slave state information of the two wireless earbuds in the pairing information, and pairing state information of the two wireless earbuds returned from the charging box is received.

This embodiment illustrates an example in which the terminal is paired with and connected with one of the two TWS earbuds (wireless earbuds) that serves as a master device in the charging box to realize the pairing connection between the terminal and two TWS earbuds. Therefore, in step S205, the processor in the terminal may send a pairing instruction to the charging box (setting a master device to enter a pairing state, as shown in FIG. 5), so as to instruct the charging box to control the TWS earbud (the right earbud in FIG. 5) that serves as the master device to be paired with the other TWS earbud that serves as a slave device, and return the pairing state information (pairing result) of master-slave pairing to the processor in the terminal.

In step S206, a pairing state is activated and the terminal is paired with and connected with the master device in the two wireless earbuds, when the pairing state information indicates a successful pairing of the two wireless earbuds.

It is understandable that by step S206, the processor in the terminal may determine whether the two wireless earbuds in the charging box are paired successfully (whether the master-slave pairing is completed) based on whether the pairing state information indicates a successful pairing, and thus activate the pairing state of the terminal so as to be paired with and connected with the one of the two wireless earbuds that serves as the master device, when the pairing state information indicates a successful pairing.

Correspondingly, for a case where the pairing state information does not indicate a successful pairing of the two wireless earbuds, the process may directly terminate; or corresponding information may be displayed through a display device in the terminal to prompt the user; or the process may return to step S205 shown in FIG. 6 to send the pairing instruction (TWS pairing instruction) to the charging box again, which may be set by a designer and is not limited herein.

As shown in FIG. 6, after step S206, there is a step for the terminal to determine whether the pairing is successful based on a result of pairing with the master device of the two wireless earbuds. The process terminates if the pairing is determined successful; or, the process proceeds to step S206 again to pair with the master device, if the pairing is determined not successful.

It should be noted that, in order to facilitate a user to know the pairing situation between the terminal and the two wireless earbuds in the charging box, information indicating a successful pairing may be displayed on a display device of the terminal, after the terminal has been paired with and connected with the master device of the two wireless earbuds in the charging box.

In this embodiment, an automatic pairing process between the terminal and the two wireless earbuds in the charging box is realized by connecting the terminal and the charging box through a USB connection. As a result, the wireless earbuds may be used directly out of the charging box after the pairing is completed. Moreover, fast wired pairing is more accurate and has more stable communication than the fast wireless broadcast pairing, thereby improving user experience.

Figure 7:
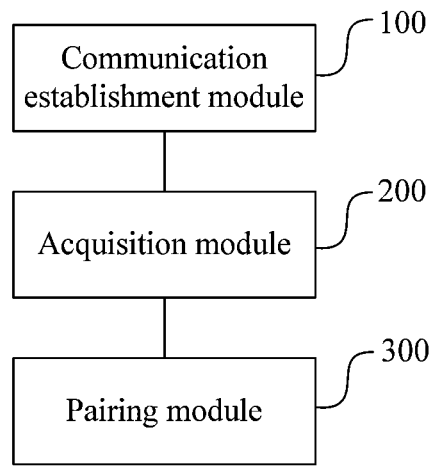
FIG. 7 is a structural block diagram of a pairing apparatus for a wireless earbud in a terminal according to an embodiment of the present disclosure.

FIG. 7 is a structural block diagram of a pairing device for a wireless earbud in a terminal according to an embodiment of the present disclosure. Referring to FIG. 7, the device may include a communication establishment module 100, an acquisition module 200, and a pairing module 300.

The communication establishment module 100 is configured to detect identification information of a charging box, and establish a communication connection with the charging box based on the identification information.

The acquisition module 200 is configured to acquire pairing information of two wireless earbuds in the charging box transmitted from the charging box.

The pairing module 300 is configured to send a pairing instruction to the charging box based on the pairing information, and activate a pairing state, so that the charging box controls a corresponding wireless earbud to be paired with and connected with the terminal based on the pairing instruction.

In an embodiment, the communication establishment module 100 may include a detection sub-module, a determination sub-module, and a communication establishment sub-module.

The detection sub-module is configured to detect PID/VID information of a charging box establishing a USB connection with the terminal.

The determination sub-module is configured to determine whether the PID/VID information is charging box information.

The communication establishment sub-module is configured to establish a USB communication connection with the charging box, if the PID/VID information is the charging box information.

In an embodiment, the pairing module 300 may include a master-slave pairing sub-module and a pairing sub-module.

The master-slave pairing sub-module is configured to send the pairing instruction to the charging box based on Bluetooth addresses and master-slave state information of the two wireless earbuds in the pairing information, and receive pairing state information of the two wireless earbuds returned from the charging box.

The pairing sub-module is configured to activate a pairing state to be paired with and connected with a master device in the two wireless earbuds, when the pairing state information indicates a successful pairing of the two wireless earbuds.

In this embodiment, the communication establishment module 100 detects identification information of a charging box, and establishes a communication connection with the charging box based on the identification information. With the charging box being identified by the terminal, two wireless earbuds in the charging box are instructed by a particular instruction to enter in a normal pairing mode. In this way, the terminal can be quickly and accurately paired with and connected with the two wireless earbuds in the charging box, which avoids error operations in pairing of the wireless earbuds or complicated operations such as searching for connection on a Bluetooth interface of the mobile phone, thereby improving user experience.

A terminal is further provided in an embodiment of the present disclosure. The terminal includes a memory for storing a computer program; and a processor configured to, when executing the computer program, implement steps of the pairing method for a wireless earbud in a terminal as provided in anyone of the above embodiments.

Figure 8:
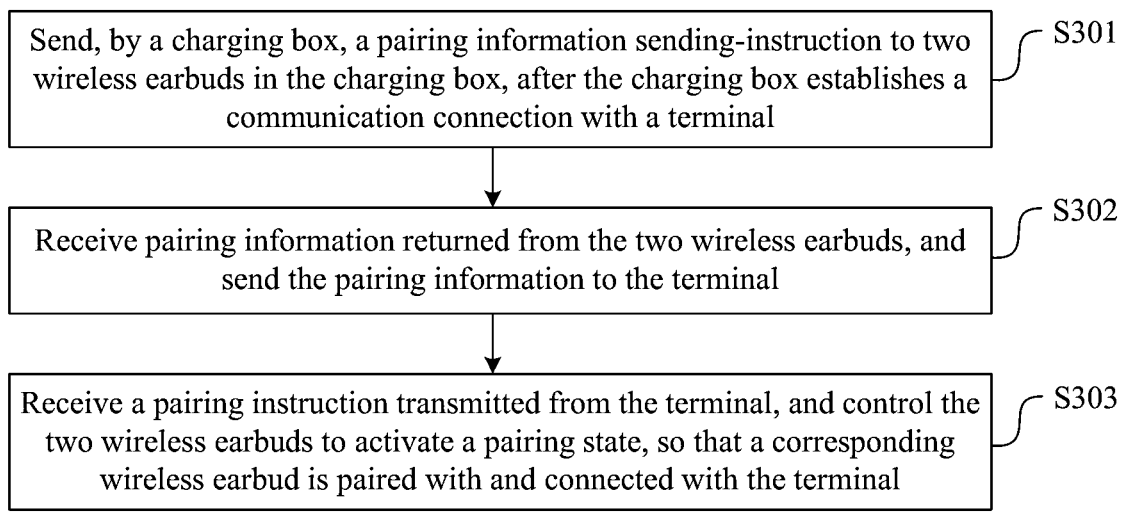
FIG. 8 is a flow chart of a pairing method for a wireless earbud in a charging box according to an embodiment of the present disclosure.

FIG. 8 is a flow chart of a pairing method for a wireless earbud in a charging box according to an embodiment of the present disclosure. Referring to FIG. 1, the method may include the following steps S301 to S303.

In step S301, a charging box sends a pairing information sending-instruction to two wireless earbuds in the charging box, after establishing a communication connection with a terminal.

By step S301, a processor in the charging box may send, after determining that the charging box has established a communication connection with the terminal, the pairing information sending-instruction to the two wireless earbuds in the charging box, so as to acquire information (pairing information) of the two wireless earbuds used for pairing with and connecting with the terminal. Correspondingly, in step S301, the charging box may establish a communication connection with the two wireless earbuds in the charging box, and a specific way of establishing a communication connection may be set by a designer. For example, the charging box may be connected to the two wireless earbuds in the charging box through a wired connection such as a UART connection, as shown in FIG. 3, that is, there is a corresponding UART circuit in the charging box, which is used to connect processors (MCUs) of the two wireless earbuds (left earbud and right earbud) to the processor (MCU) in the charging box when the two wireless earbuds are put into the charging box; or the charging box may be connected to the two wireless earbuds in the charging box through a wireless connection such as a UART connection, which is not limited herein.

It should be noted that the specific way for the processor in the charging box to send the pairing information sending-instruction to the two wireless earbuds in the charging box in step S301 may be that: the processor in the charging box directly sends the pairing information sending-instruction to the two wireless earbuds in the charging box after determining that the charging box has established a communication connection with the terminal; or sends the pairing information sending-instruction to the two wireless earbuds in the charging box in response to receiving a pairing information acquiring-instruction transmitted from the terminal through the communication connection. For example, in step S301, pairing information sending-instruction may be sent to each wireless earbud through a UART communication connection, in response to the pairing information acquiring-instruction transmitted from the terminal through a USB communication connection.

The specific way is not limited in this embodiment.

In step S302, pairing information returned from the two wireless earbuds is received, and the pairing information is sent to the terminal.

By step S302, the charging box may send, to the terminal, the received information (pairing information) of the two wireless earbuds for pairing with and connecting with the terminal, so that the terminal can obtain the pairing information.

A specific content of the pairing information transmitted from the processor in the charging box to the terminal in step S302 may be set by a designer. In a case that the wireless earbud is a TWS Bluetooth earbud, the pairing information may include Bluetooth addresses and master-slave state information of two wireless earbuds in the charging box; or may include only a Bluetooth address of one of the two wireless earbuds that serves as a master device in the charging box; or may include Bluetooth addresses and master-slave state information of the two wireless earbuds in the charging box, and state information indicating whether the wireless earbuds are disposed in the charging box. That is, the charging box may determine the state information indicating whether each of the wireless earbuds is disposed in the charging box through a communication circuit with each wireless earbud or a corresponding detecting device. The content of the pairing information is not limited herein, as long as the terminal can determine, based on the received pairing information, that there are two wireless earbuds in the charging box, and obtain information required for pairing with and connecting with the two wireless earbuds existed in the charging box.

In step S303, a pairing instruction sent from the terminal is received, and the two wireless earbuds are controlled to activate a pairing state, so that a corresponding wireless earbud is paired with and connected with the terminal.

By step S303, the charging box can control the two wireless earbuds to activate a pairing state upon receiving the pairing instruction sent from the terminal, so that a corresponding wireless earbud in the charging box is paired with and connected with the terminal, thereby realizing the pairing connection (such as TWS pairing connection) between the terminal and the two wireless earbuds. Specifically, it may be set, by the designer, the corresponding wireless earbud to be paired with and connected with the terminal in step S303. In a case that the terminal realizes the pairing connection with two wireless earbuds by being paired with and connected with a master device of the two wireless earbuds, the corresponding wireless earbud in step S303 may be one of the two wireless earbuds that serves as a master device in the charging box. In a case that the terminal realizes the pairing connection with the two wireless earbuds by being simultaneously paired with and connected with both of the two wireless earbuds, the corresponding wireless earbud in step S303 may be both the two wireless earbuds in the charging box. No limitation is made thereto in this embodiment.

Correspondingly, in a case that the terminal realizes the pairing connection with the two wireless earbuds by being paired with and connected with the master device of the two wireless earbuds, in step S303, the charging box may send, based on the received pairing instruction, a corresponding pairing instruction (such as a TWS pairing instruction) to the master device of the two wireless earbuds, to control the master device to be paired with and connected with the other wireless earbud (master-slave pairing); receive pairing state information returned from the master device, and send the pairing state information to the terminal to inform that the terminal may activate a pairing state to pair with and connect with the master device.

It should be noted that this embodiment illustrates an example in which the charging box controls the two wireless earbuds in the charging box to be paired with and connected with the terminal. In a case that only one wireless earbud is put in the charging box, the way for the charging box to control one of the wireless earbuds in the charging box to realize the pairing connection with the terminal may be the same or similar as the way provided in the embodiment, and is not limited herein.

In this embodiment, the charging box receives the pairing instruction sent from the terminal, and controls the two wireless earbuds to activate a pairing state, so that a corresponding wireless earbud is paired with and connected with the terminal. With the charging box being identified by the terminal, two wireless earbuds in the charging box are instructed by a particular instruction to enter in a normal pairing mode. In this way, the terminal can be quickly and accurately paired with and connected with the two wireless earbuds in the charging box, which avoids error operations in pairing of the wireless earbuds or complicated operations such as searching for connection on a Bluetooth interface of the mobile phone, thereby improving user experience.

Figure 9:
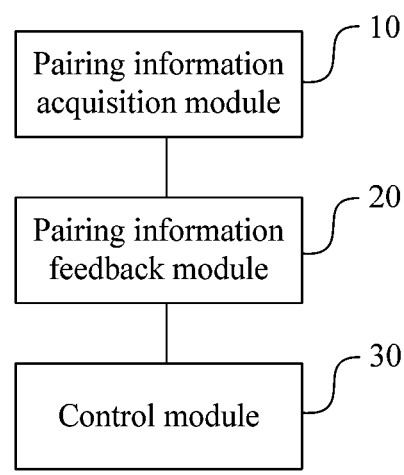
FIG. 9 is a structural block diagram of a pairing apparatus for a wireless earbud in a charging box according to an embodiment of the present disclosure.

FIG. 9 is a structural block diagram of a pairing apparatus for a wireless earbud in a charging box according to an embodiment of the present disclosure. Referring to FIG. 9, the apparatus may include a pairing information acquisition module 10, a pairing information feedback module 20, and a control module 30.

The pairing information acquisition module 10 is configured to send a pairing information sending-instruction to two wireless earbuds in a charging box, after a communication connection is established between the charging box and a terminal.

The pairing information feedback module 20 is configured to receive pairing information returned from the two wireless earbuds, and send the pairing information to the terminal.

The control module 30 is configured to receive a pairing instruction transmitted from the terminal, and control the two wireless earbuds to activate a pairing state, so that a corresponding wireless earbud is paired with and connected with the terminal.

In an embodiment, the pairing information acquisition module 10 may be specifically configured to send the pairing information sending-instruction to each of the wireless earbuds through a UART communication connection, in response to a pairing information acquiring-instruction transmitted from the terminal through a USB communication connection.

In an embodiment, the control module 30 may include a transmission sub-module and a feedback sub-module.

The transmission sub-module is configured to send, based on the pairing instruction, a TWS pairing instruction to a master device in the two wireless earbuds, to control the master device to be paired with and connected with the other wireless earbud.

The feedback sub-module is configured to receive pairing state information returned from the master device, and send the pairing state information to the terminal.

In this embodiment, the control module 30 receives the pairing instruction from a terminal and controls the two wireless earbuds to activate a pairing state, to control a corresponding earbud to be paired with and connected with the terminal. With the charging box being identified by the terminal, two wireless earbuds in the charging box are instructed by a particular instruction to enter in a normal pairing mode. In this way, the terminal can be quickly and accurately paired with and connected with the two wireless earbuds in the charging box, which avoids error operations in pairing of the wireless earbuds or complicated operations such as searching for connection on a Bluetooth interface of the mobile phone, thereby improving user experience.

In addition, a charging box is further provided in an embodiment of the present disclosure. The charging box includes a memory for storing a computer program; and a processor configured to, when executing the computer program, implement steps of the pairing method for a wireless earbud in the charging box as provided in the above embodiments.

The embodiments in this specification are described in a progressive way, each of which emphasizes the differences from others, and the same or similar parts among the embodiments can be referred to each other. Descriptions of the apparatus, the terminal and the charging box disclosed in the embodiments are simple since they correspond to the method disclosed in one of embodiments, and related explanations may be referred to the descriptions of the method.

It is further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above with regard to functions. Whether the functions are implemented by hardware or by software depends on specific applications and design constraints of the technical solutions. Those skilled in the art may use different methods for each particular application to implement the described functions, but such implementation should not be considered as going beyond the scope of the present disclosure.

The steps of the method or algorithm according to the embodiments disclosed herein may be implemented by hardware, a software module executed by a processor, or a combination of the hardware and the software module. The software modules may reside in a random access memory (RAM), an internal memory, a read only memory (ROM), an electrically programmable ROM, an electrically-erasable programmable ROM, a register, a hard disk, a removable disk drive, CD-ROM, or any other types of storage medium known in the art.

The pairing method and apparatus for a wireless earbud, the terminal and the charging box according to the present disclosure are described in detail above. Specific examples are used in this specification to illustrate the principle and implementation of the present disclosure. The description of the above embodiments is only used to facilitate understanding of the method and core concept of the present disclosure. It should be pointed out that, various improvements and modifications can be made by those skilled in the art without departing from the principle of the present disclosure, and these improvements and modifications should fall within the protection scope of the present disclosure.

The invention claimed is:

1. A pairing method for a wireless earbud, which is performed by a terminal and comprises:
   detecting identification information of a charging box, and establishing a communication connection with the charging box based on the identification information;
   acquiring pairing information of two wireless earbuds in the charging box transmitted from the charging box, wherein each of the two wireless earbuds is in a communication connection with the charging box; and
   sending a pairing instruction to the charging box based on the pairing information, and activating a pairing state, so that the charging box controls a corresponding wireless earbud to be paired with and connected with the terminal based on the pairing instruction,
   wherein in a case that the wireless earbud is a true wireless stereo earbud, the sending a pairing instruction to the charging box based on the pairing information and activating a pairing state, so that the charging box controls a corresponding wireless earbud to be paired with and connected with the terminal based on the pairing instruction comprises:

sending, based on Bluetooth addresses and master-slave state information of the two wireless earbuds in the pairing information, the pairing instruction to the charging box, and receiving pairing state information of the two wireless earbuds returned from the charging box; and activating the pairing state to pair with and connect with a master device of the two wireless earbuds, when the pairing state information indicates a successful pairing of the two wireless earbuds.

2. The pairing method for a wireless earbud according to claim 1, wherein the detecting identification information of a charging box and establishing a communication connection with the charging box based on the identification information comprises:

detecting Product ID/Vender ID information of the charging box establishing a USB connection with the terminal;

determining whether the Product ID/Vender ID information is charging box information; and establishing a USB communication connection with the charging box, in response to a positive determination.

3. A terminal, comprising:
a memory for storing a computer program; and
a processor, configured to, when executing the computer program, implement steps of the pairing method for a wireless earbud according to claim 1.

4. A pairing method for a wireless earbud, which is performed by a charging box and comprises:

sending a pairing information sending-instruction to two wireless earbuds in the charging box, after the charging box establishes a communication connection with a terminal;

receiving pairing information returned from the two wireless earbuds, and sending the pairing information to the terminal; and receiving a pairing instruction transmitted from the terminal, and controlling the two wireless earbuds to activate a pairing state, so that a corresponding wireless earbud is paired with and connected with the terminal, wherein in a case that the wireless earbud is a true wireless stereo earbud, the receiving a pairing instruction transmitted from the terminal, and controlling the two wireless earbuds to activate a pairing state, so that a corresponding wireless earbud is paired with and connected with the terminal comprises:

sending, in response to the pairing instruction, a true wireless stereo pairing instruction to a master device of the two wireless earbuds, so that the master device is paired with and connected with the other wireless earbud; and receiving pairing state information returned from the master device, and sending the pairing state information to the terminal.

5. The pairing method for a wireless earbud according to The pairing method for a wireless earbud according to wherein the sending a pairing information sending-instruction to two wireless earbuds in the charging box comprises:

sending the pairing information sending-instruction to each of the wireless earbuds through a Universal Asynchronous Receiver/Transmitter communication connection, in response to a pairing information acquiring-instruction transmitted from the terminal through a USB communication connection.

6. A charging box, comprising:
a memory for storing a computer program; and
a processor, configured to, when executing the computer program, implement steps of the pairing method for a wireless earbud according to claim 4.

* * * * *